(12) United States Patent
Benz et al.

(10) Patent No.: US 7,015,452 B2
(45) Date of Patent: Mar. 21, 2006

(54) INTENSIFIED HYBRID SOLID-STATE SENSOR

(75) Inventors: Rudolph G. Benz, Daleville, VA (US); Nils I. Thomas, Roanoke, VA (US); Arlynn W. Smith, Blue Ridge, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 9 days.

(21) Appl. No.: 10/824,084

(22) Filed: Apr. 14, 2004

(65) Prior Publication Data

US 2005/0167575 A1    Aug. 4, 2005

Related U.S. Application Data

(63) Continuation-in-part of application No. 09/973,907, filed on Oct. 9, 2001, now Pat. No. 6,747,258.

(51) Int. Cl.
*H01J 31/50* (2006.01)
(52) U.S. Cl. ............................ 250/214 VT; 313/103 R; 313/103 CN
(58) Field of Classification Search ......... 250/214 VT, 250/208.1, 370.09, 370.11; 348/162; 313/313 R, 313/103, 103 R
See application file for complete search history.

(56) References Cited

U.S. PATENT DOCUMENTS

| | | | |
|---|---|---|---|
| 4,355,229 A | 10/1982 | Zimmerman et al. | |
| 4,395,636 A | 7/1983 | Anger et al. | |
| 4,471,378 A * | 9/1984 | Ng | 348/162 |
| 4,555,731 A | 11/1985 | Zinchuk | |
| 4,796,090 A | 1/1989 | Fraier | |
| 4,974,090 A | 11/1990 | Kawamura et al. | |
| 4,980,772 A | 12/1990 | Kawamura et al. | |
| 5,029,963 A | 7/1991 | Naselli et al. | |
| 5,084,780 A | 1/1992 | Phillips | |
| 5,099,128 A | 3/1992 | Stettner | |
| 5,218,194 A | 6/1993 | Garbi et al. | |
| 5,349,177 A | 9/1994 | Thomas et al. | |
| 5,665,959 A | 9/1997 | Fossum et al. | |
| 5,734,172 A * | 3/1998 | Pryor | 250/559.23 |
| 6,069,352 A | 5/2000 | Castracane et al. | |

(Continued)

FOREIGN PATENT DOCUMENTS

DE     42 37 097     5/1993

(Continued)

OTHER PUBLICATIONS

International Search Report Dated Deptember 30, 2002.

(Continued)

*Primary Examiner*—David Porta
*Assistant Examiner*—Tony Ko
(74) *Attorney, Agent, or Firm*—RatnerPrestia

(57) ABSTRACT

An intensified solid-state imaging sensor includes a photo cathode for converting light from an image into electrons, an electron multiplying device for receiving electrons from the photo cathode, and a solid-state image sensor including a plurality of pixels for receiving the electrons from the electron multiplying device through a plurality of channels of the electron multiplying device. The solid-state image sensor generates an intensified image signal from the electrons received from the electron multiplying device. The plurality of channels are arranged in a plurality of channel patterns, and the plurality of pixels are arranged in a plurality of pixel patterns. Each of the plurality of channel patterns is mapped to a respective one of the plurality of pixel patterns such that electron signals from each of the plurality of channel patterns is substantially received by the single respective one of the plurality of pixel patterns.

10 Claims, 14 Drawing Sheets

U.S. PATENT DOCUMENTS

| | | |
|---|---|---|
| 6,072,565 A | 6/2000 | Porter |
| 6,271,511 B1 | 8/2001 | Pierle |
| 6,278,104 B1 | 8/2001 | Saldana et al. |
| 6,285,018 B1 | 9/2001 | Aebi et al. |
| 6,303,918 B1 | 10/2001 | Estrera et al. |
| 6,333,205 B1 | 12/2001 | Rhodes |

FOREIGN PATENT DOCUMENTS

| | | |
|---|---|---|
| DE | 199 27 694 | 11/2000 |
| EP | 0 053 530 | 6/1982 |
| EP | 1 048 939 | 11/2000 |
| EP | 1 120 812 | 8/2001 |
| WO | WO 01/71381 | 9/2001 |
| WO | WO 03/032358 A1 | 4/2003 |

OTHER PUBLICATIONS

International Search Report, Appln. No. PCT/US2005/012438, dated Apr. 11, 2005.

* cited by examiner

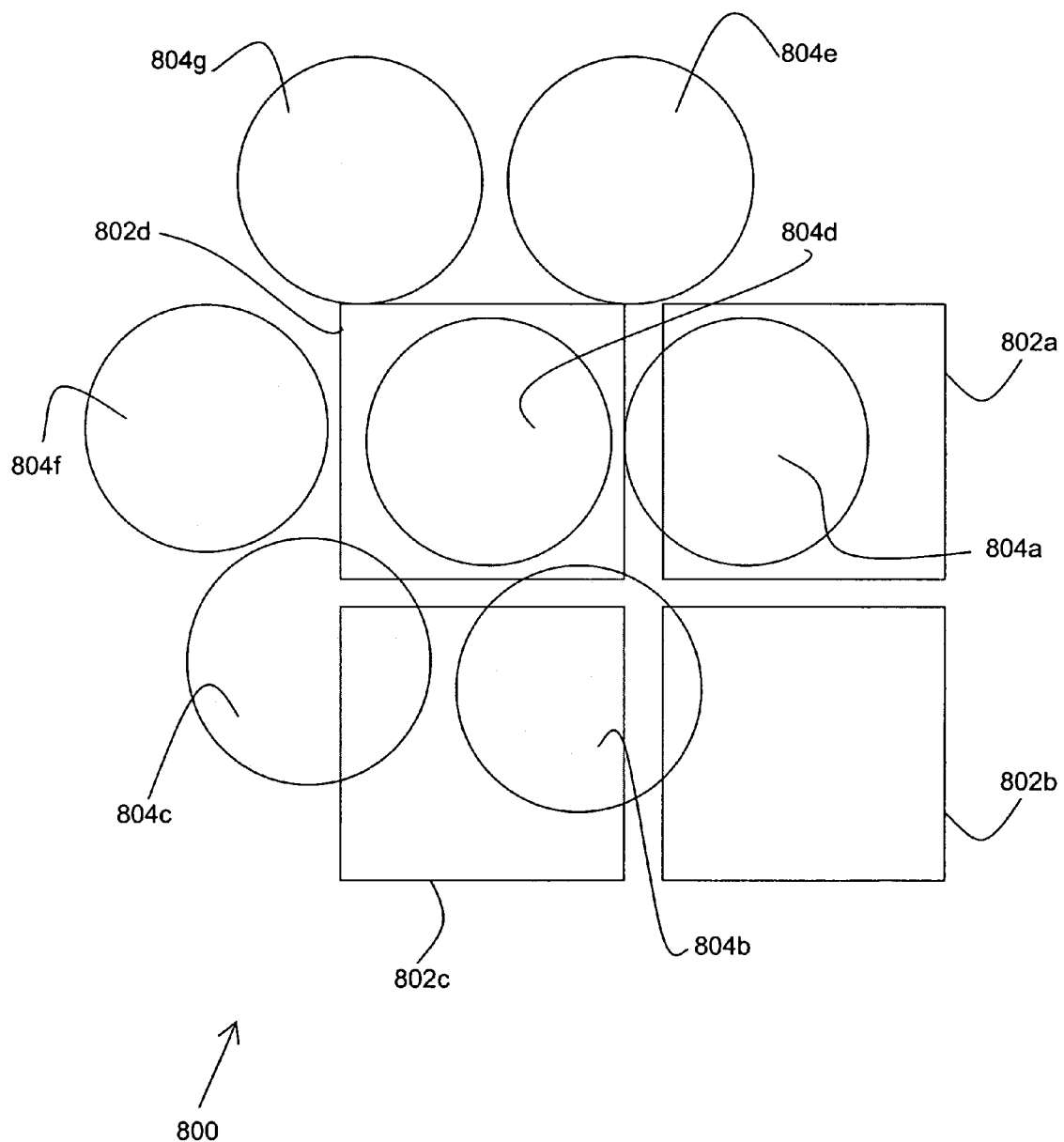

INTENSIFIED HYBRID SOLID-STATE SENSOR

RELATED APPLICATION

The present application is a continuation-in-part of pending U.S. patent application Ser. No. 09/973,907 filed on behalf of inventors Rudolph G. Benz, Nils I. Thomas, and Arlynn W. Smith on Oct. 9, 2001, now U.S. Pat. No. 6,747,258, titled INTENSIFIED HYBRID SOLID-STATE SENSOR WITH AN INSULATING LAYER, assigned to the assignee of the present application, and incorporated in this application by reference.

FIELD OF THE INVENTION

The present invention is directed to an intensified hybrid solid-state sensor. More particularly, the present invention relates to an image intensifier using a CMOS or CCD sensing device connected in close physical proximity to a microchannel plate (MCP) and photo cathode.

BACKGROUND OF THE INVENTION

The present invention relates to the field of image intensifying devices using solid-state sensors, such as a CMOS or CCD device. Image intensifier devices are used to amplify low intensity light or convert non-visible light into readily viewable images. Image intensifier devices are particularly useful for providing images from infrared light and have many industrial and military applications. For example, image intensifier tubes are used for enhancing the night vision of aviators, for photographing astronomical bodies and for providing night vision to sufferers of retinitis pigmentosa (night blindness).

There are three types of known image intensifying devices in prior art; image intensifier tubes for cameras, all solid-state CMOS and CCD sensors, and hybrid EBCCD/CMOS (Electronic Bombarded CCD or CMOS sensor).

Image intensifier tubes are well known and used throughout many industries. Referring to FIG. 1, a current state of the prior art Generation III (GEN III) image intensifier tube 10 is shown. Examples of the use of such a GEN III image intensifier tube in the prior art are exemplified in U.S. Pat. No. 5,029,963 to Naselli, et al., entitled REPLACEMENT DEVICE FOR A DRIVER'S VIEWER and U.S. Pat. No. 5,084,780 to Phillips, entitled TELESCOPIC SIGHT FOR DAYLIGHT VIEWING. The GEN III image intensifier tube 10 shown, and in both cited references, is of the type currently manufactured by ITT Corporation, the assignee herein. In the intensifier tube 10 shown in FIG. 1, infrared energy impinges upon a photo cathode 12. The photo cathode 12 is comprised of a glass faceplate 14 coated on one side with an antireflection layer 16, a gallium aluminum arsenide (GaAlAs) window layer 17 and a gallium arsenide (GaAs) active layer 18. Infrared energy is absorbed in GaAs active layer 18 thereby resulting in the generation of electron/hole pairs. The produced electrons are then emitted into the vacuum housing 22 through a negative electron affinity (NEA) coating 20 present on the GaAs active layer 18.

A microchannel plate (MCP) 24 is positioned within the vacuum housing 22, adjacent the NEA coating 20 of the photo cathode 12. Conventionally, the MCP 24 is made of glass having a conductive input surface 26 and a conductive output surface 28. Once electrons exit the photo cathode 12, the electrons are accelerated toward the input surface 26 of the MCP 24 by a difference in potential between the input surface 26 and the photo cathode 12 of approximately 300 to 900 volts. As the electrons bombard the input surface 26 of the MCP 24, secondary electrons are generated within the MCP 24. The MCP 24 may generate several hundred electrons for each electron entering the input surface 26. The MCP 24 is subjected to a difference in potential between the input surface 26 and the output surface 28, which is typically about 1100 volts, whereby the potential difference enables electron multiplication.

As the multiplied electrons exit the MCP 24, the electrons are accelerated through the vacuum housing 22 toward the phosphor screen 30 by the difference in potential between the phosphor screen 30 and the output surface 28 of approximately 4200 volts. As the electrons impinge upon the phosphor screen 30, many photons are produced per electron. The photons create the output image for the image intensifier tube 10 on the output surface 28 of the optical inverter element 31.

Image intensifiers such as those illustrated in FIG. 1 have advantages over other forms of image intensifiers. First, intensifiers have a logarithmic gain curve. That is, the gain decreases as the input light level is increased. This matches the human eye response particularly when bright lights are in the same scene as low lights. Most solid-state devices have a linear response; i.e., the brighter the light the brighter the output signal. The result is that bright lights appear much brighter to a viewer of a solid-state system and tend to wash out the scene. Solid-state sensors can be modified to produce a gain decrease as input light is increased, however, this requires changing the amplifier gain, using shuttering, or using anti-blooming control.

Another advantage of image intensifiers is the ability to function over a large range of input light levels. The power supply can control the cathode voltage and thereby change the tube gain to fit the scene. Thus tubes can function from overcast starlight to daytime conditions.

However, image intensifier/$I^2$ cameras suffer from numerous disadvantages. The electron optics of the phosphor screen produces a low contrast image. This results in the object looking fuzzier to the human observer, or solid-state sensor, when viewed through an image intensifier. Although this deficiency has been somewhat reduced with further image intensifier development, solid-state imagers generally have better performance.

Another disadvantage with image intensifier/$I^2$ cameras is "halo." Halo results from electrons being reflected off either the MCP or the screen. The reflected electrons are then amplified and converted into light in the form of a ring around the original image. In image tubes, the halo from electrons reflected from the MCP has been reduced to a negligible effect for the most recent production tubes. However, the halo from the screen section still exists, although not to the degree of the cathode halo. Nevertheless, the screen halo is still a significant defect in imaging systems when a CCD or CMOS array is coupled to the image intensifier. This is because these arrays are more sensitive than the eye to the low light levels in the screen halo.

Another disadvantage is that image intensifiers do not have a method of providing electronic read-out. Electronic read-out is desired so that imagery from thermal sensors may be combined with intensified imagery with the result that the information from both spectra will be viewed at the same time. One solution has been to create an $I^2$ camera by coupling a CCD or CMOS array to an image intensifier tube. When a solid-state device is coupled to an image tube the resultant camera has all performance defects of the image tube that is low contrast, often poor limiting resolution due to coupling inefficiencies and the added cost of the image tube to the camera.

Solid-state devices typically include CCD or CMOS. They function by directly detecting the light, electronically transferring the signal to solid-state amplifiers, then displaying the image on either a television type tube or display such as a liquid crystal display. FIGS. 2a and 2b illustrate a flow chart and schematic diagram for a typical CCD sensor.

CCD and CMOS sensors are solid-state devices; that is, there is no vacuum envelope and the output is an electronic signal that must be displayed elsewhere and not within the sensor. The solid-state devices operate with power of 5–15 volts. The light is detected in individual pixels as labeled "s" and translated into electrons that are stored in the pixel until the pixel is read out to the storage register. From the storage register the electronic information contained in multiple pixels is then transferred to a read out register and then to output amplifiers and then to a video display device such as a cathode ray tube.

The disadvantages of an all solid-state device are poor low light level performance, potential blooming from bright light sources, poor limiting resolution, and high power consumption. The poor low light performance is due to dark current and read-out noise resulting in low signal-noise ratios. If a signal gain mechanism were provided prior to read-out this issue would be negated, as sufficient signal would exist to overcome the noise sources. Solid-state device architectures usually do not permit an amplification section prior to read-out. The poor limiting resolution is due to large pixel sizes usually chosen in an attempt to collect a large signal and thereby increase the signal to noise ratio. These disadvantages have effectively prevented the use of solid-state sensors in night vision applications. The advantages of solid-state devices are better image contrast as compared to the image intensifier/$I^2$ camera, the availability of electronic read-out, and lower cost, particularly when the solid-state sensor is a CMOS array.

As can be seen, the strengths and weaknesses of image intensifiers and solid-state sensors compliment each other and theoretically a combination of both devices would give better performance. One such combination proposed as an alternative to image intensifiers/$I^2$ cameras and solid-state sensors, is the electron bombarded CCD/CMOS sensor (EBCCD/CMOS). This device consists of the photo-cathode and body envelope of the image tube, and either a CCD or CMOS sensor integrated into this envelope. An illustrative example of an EBCCD/CMOS sensor is shown in FIG. 3. A high voltage is applied between the cathode and solid-state sensor so that the resulting electrons are amplified within the silicon in the solid-state sensor by electron bombardment.

The advantages of the EBCCD/CMOS device are that it provides electronic read-out. But the disadvantages are numerous. First, the intra-scene dynamic range is compressed. This means that overall contrast within the scene, when bright objects are next to dark objects, is reduced compared to an image intensifier/$I^2$ camera and all solid-state device. Secondly, the sensor suffers "halo" degradation of the image around bright lights due to electrons reflected off of the solid-state sensor. This halo exists in regular image tubes; however, technological improvements have reduced the halo to the point of non-existence. Thirdly, the very high voltage required to operate the device (2–10 kV) damages the silicon surface causing decay in performance over time.

Therefore, it is an object of the present invention to provide an intensified hybrid solid-state sensor that combines the functions of the image intensifier, good signal-to-noise ratio and high logarithmic gain, with the electronic read-out functions either of a Complementary Metal Oxide Semiconductor (CMOS) or Charged Coupled Device (CCD).

SUMMARY OF THE INVENTION

According to an exemplary embodiment of the present invention, an intensified solid-state imaging sensor includes a photo cathode for converting light from an image into electrons. The intensified solid-state imaging sensor also includes an electron multiplying device for receiving electrons from the photo cathode. The electron multiplying device outputs a greater number of electrons than the electron multiplying device receives from the photo cathode. The intensified solid-state imaging sensor also includes a solid-state image sensor including a plurality of pixels for receiving the electrons from the electron multiplying device through a plurality of channels of the electron multiplying device. The solid-state image sensor generates an intensified image signal from the electrons received from the electron multiplying device. The plurality of channels are arranged in a plurality of channel patterns, and the plurality of pixels are arranged in a plurality of pixel patterns. Each of the plurality of channel patterns is mapped to a respective one of the plurality of pixel patterns such that electron signals from each of the plurality of channel patterns is substantially received by the single respective one of the plurality of pixel patterns.

BRIEF DESCRIPTION OF THE DRAWINGS

In order that the invention will become more clearly understood it will be disclosed in greater detail with reference to the accompanying drawings, in which:

FIG. 8 is an illustration of misalignment of an electron multiplying device channel pattern with an image sensor pixel pattern for use in describing the benefits of exemplary embodiments of the present invention;

DETAILED DESCRIPTION OF THE INVENTION

Preferred features of embodiments of this invention will now be described with reference to the figures. It will be appreciated that the spirit and scope of the invention is not limited to the embodiments selected for illustration. Also, it should be noted that the drawings are not rendered to any particular scale or proportion. It is contemplated that any of the configurations and materials described hereafter can be modified within the scope of this invention.

In copending U.S. patent application Ser. No. 09/973,907, the present invention was described as providing an intensified hybrid solid-state sensor. The solid-state sensor, according to the present invention, includes an imaging device comprising a solid-state sensor assembled with an image intensifier cathode, microchannel plate (MCP), and body envelope. This device combines the best functions of the image intensifier, good signal-to-noise ratio and high logarithmic gain, with the electronic read-out functions either of a Complementary Metal Oxide Semiconductor (CMOS) or Charged Coupled Device (CCD). Applications for this invention are primarily night vision systems where good low light sensitivity and high gain are required.

Figure 4A:
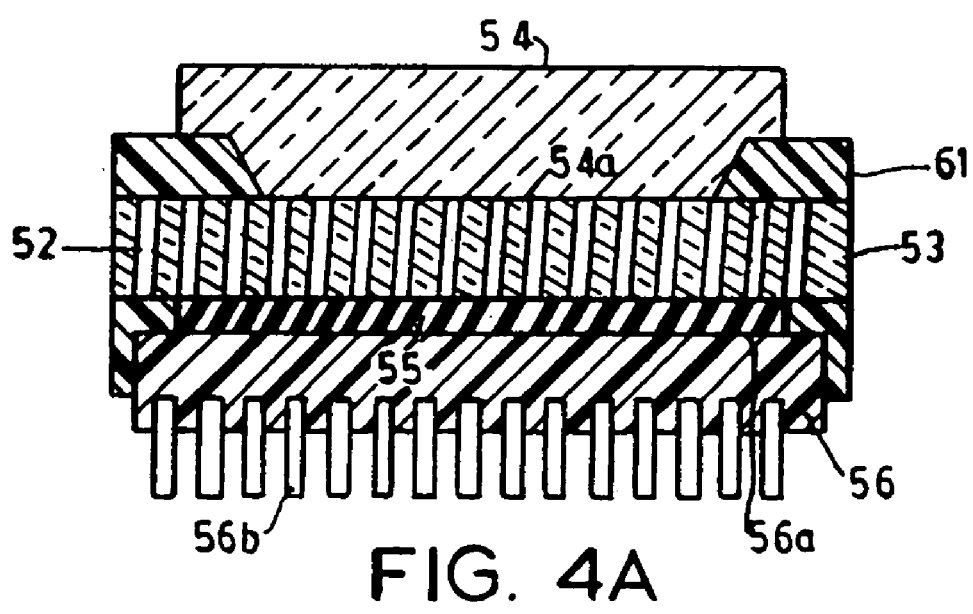
FIG. 4A is a cross-sectional view of an intensified hybrid solid-state sensor according to the present invention.
Figure 4B:
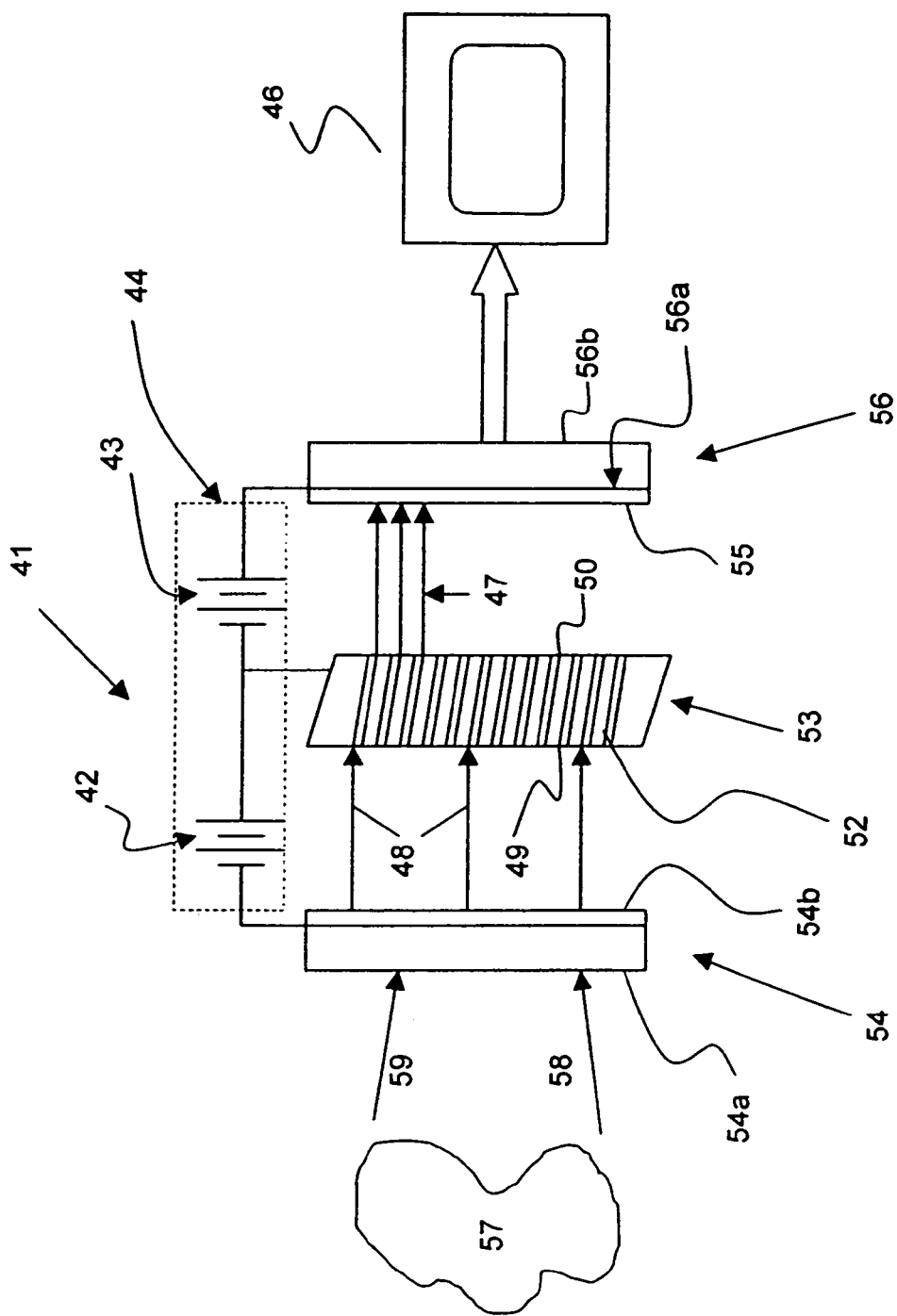
FIG. 4B is a schematic representation of an intensified hybrid solid-state sensor according to the present invention.
Figure 5A:
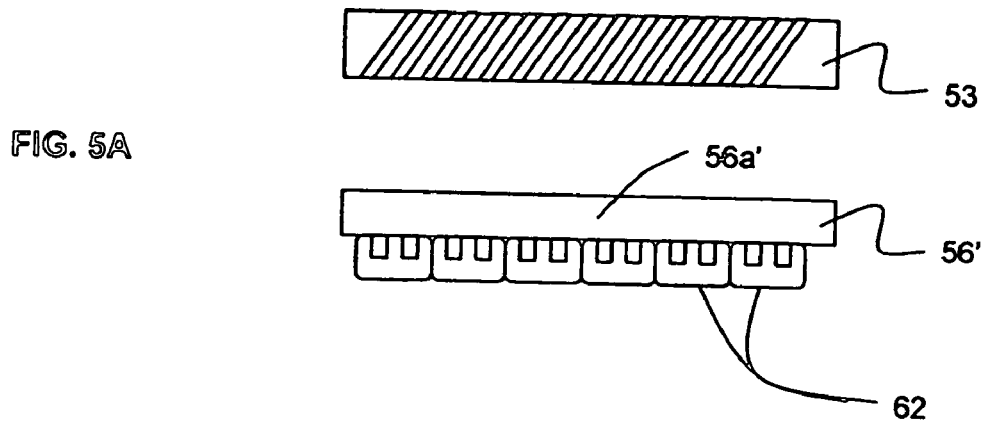
FIG. 5A is a schematic illustration of a microchannel plate (MCP) and a back thinned CCD for use in the present invention.
Figure 5B:
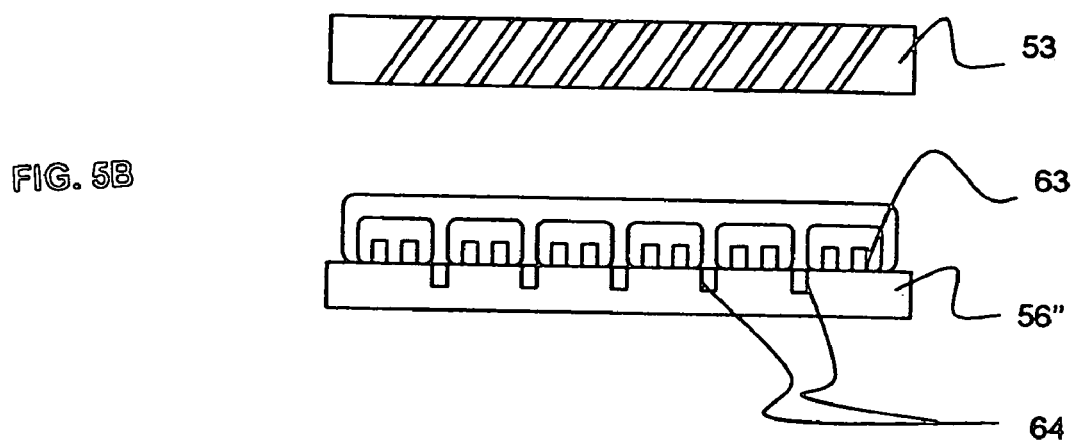
FIG. 5B is a schematic illustration of a microchannel plate (MCP) and a standard CCD for use in the present invention.
Figure 5C:
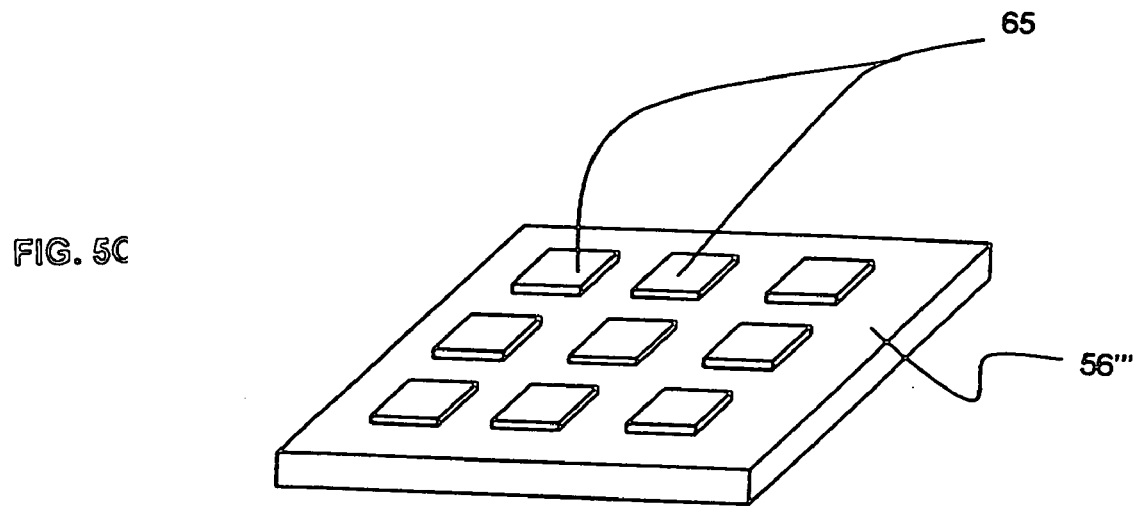
FIG. 5C is a perspective view of a CMOS-type image sensor for use with the present invention.

FIG. 4B is a schematic representation of an intensified hybrid solid-state sensor device 41 according to the present invention. Sensor 41 comprises a standard image tube photo cathode 54, a microchannel plate (MCP) 53 and a solid-state imaging sensor 56. Solid-state imaging sensor 56 can be any type of solid-state imaging sensor. Preferably, solid-state imaging sensor 56 is a CCD device. More preferably, solid-state imaging sensor 56 is a CMOS imaging sensor. FIG. 5A illustrates a back-thinned CCD imaging device as imaging sensor 56'. In this embodiment, MCP 53 is connected with a back-thinned CCD sensor 56'. Back-thinned CCD 56' includes an electron receiving surface, such as diffusion collection area 56a' and a readout area 62. FIG. 5B illustrates an alternative standard CCD imaging device including MCP 53 connected to a standard CCD 56". CCD 56" includes an oxide cover 63 and plurality of collection wells 64. FIG. 5C illustrates the sensor as a CMOS sensor, including a CMOS substrate 56" and a plurality of collection wells 65.

For various reasons, CCD based image sensors are limited or impractical for use in many applications. First, CCDs require at least two polysilicon layers with a buried-channel implant to achieve their high performance, meaning that they cannot be fabricated using standard CMOS fabrication processes. Second, the level of integration that can be achieved with CCD based imagers is low since they cannot include the devices necessary to integrate them with other devices in an application. Finally, the circuits used to transfer data out of the image array to other devices on the system board, such as Digital Signal Processors (DSPs) and other image processing circuits, have a large capacitance and require voltages higher than the other circuits. Since the currents associated with charging and discharging these capacitors are usually significant, a CCD imager is not particularly well suited for portable or battery operated applications.

As such, less expensive image sensors fabricated out of integrated circuits using standard CMOS processes are desirable. Essentially, with a CMOS type imager sensor, a photo diode, phototransistor or other similar device is employed as a light-detecting element. The output of the light-detecting element is an analog signal whose magnitude is approximately proportional to the amount of light received by the element. CMOS imagers are preferred in some applications since they use less power, have lower fabrication costs and offer higher system integration compared to imagers made with CCD processes. Moreover, CMOS imagers have the added advantages that they can be manufactured using processes similar to those commonly used to manufacture logic transistors. While the preferred embodiment of the invention incorporates a CMOS sensor as the imaging sensor 56, any solid-state imaging sensor would work and is within the scope of the present application.

Referring again to FIG. 4B, photo cathode 54 can be a standard photo cathode as used in any known type of image intensifying device. Photo cathode 54 can be, but is not limited to, a material such a GaAs, Bialkali, InGaAs, and the like. Photo cathode 54 includes an input side 54a and an output side 54b. MCP 53 can be, but is not limited to a silicon or glass material, and is preferably about 10 to 25 mm thick. MCP 53 has a plurality of channels 52 formed between an input surface 49 and output surface 50. Channels 52 can have any type of profile, for example a round profile 52' (FIG. 6A) or a square profile 52" (FIG. 6B.) MCP 53 is connected to electron receiving surface 56a of imaging sensor 56.

Preferably, output surface 50 of MCP 53 is physically in contact with electron receiving surface 56a of imaging sensor 56. However, insulation may be necessary between MCP 53 and imaging sensor 56. Accordingly, a thin insulating spacer 55 may be inserted between output surface 50 of MCP 53 and electron receiving surface 56a of imaging sensor 56. Insulating space 55 can be made of any electrical insulating material and is preferably formed as a thin layer, no more than several microns thick, deposited over electron receiving surface 56a of imaging sensor 56. For example, such an insulating spacer may be, but is not limited to, an approximately 10 $\mu$m thick film. Alternatively, insulating spacer 55 could be a film formed on the output surface 50 of MCP 53 (not shown).

CMOS imaging sensor 56 includes electron receiving surface 56a and output 56b. The increased number of electrons 47 emitted from MCP 53 strike electron receiving surface 56a. Electron receiving surface 56a comprises a CMOS substrate 56'" and a plurality of collection wells 65 (FIG. 5C). Electrons 47 (See FIG. 4B) collected in collection wells 65 are processed using standard signal processing equipment for CMOS sensors to produce an intensified image signal that is sent through output 56b to an image display device 46.

Figure 1:
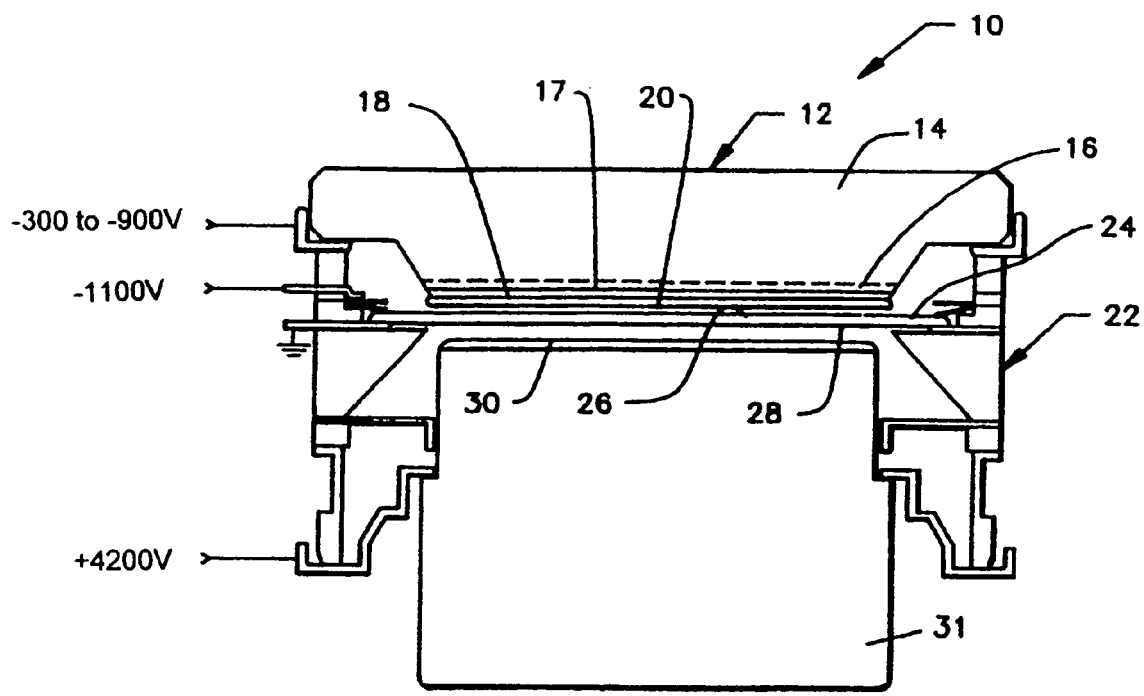
FIG. 1 is a schematic illustration of a typical image intensifying tube.
Figure 2A:
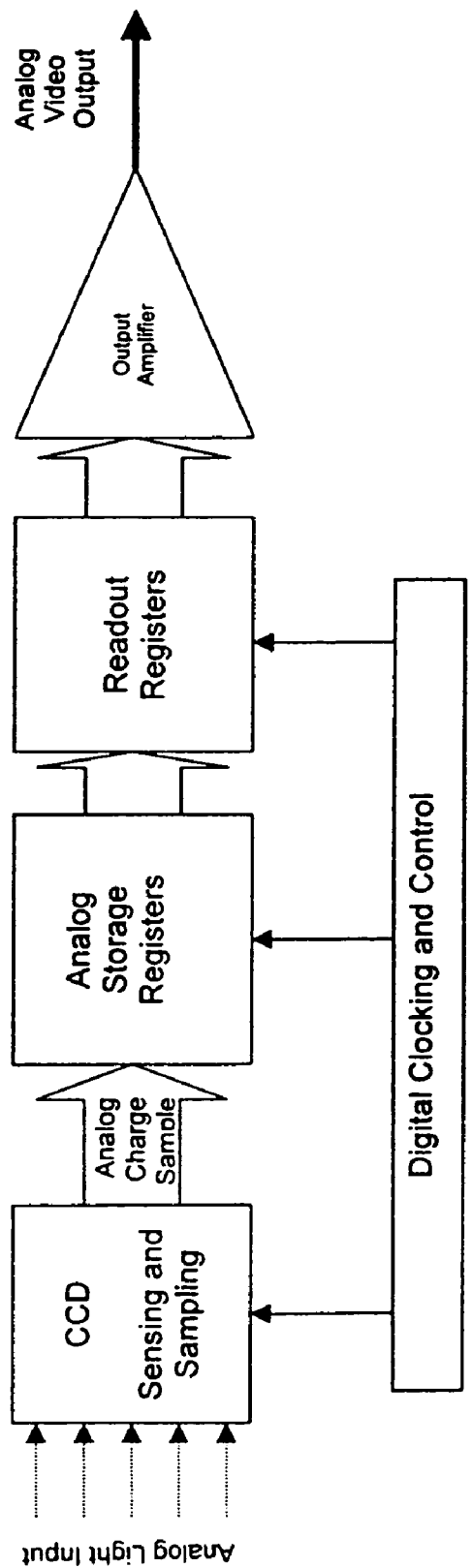
FIG. 2A is a flow chart for a typical CCD sensor.
Figure 2B:
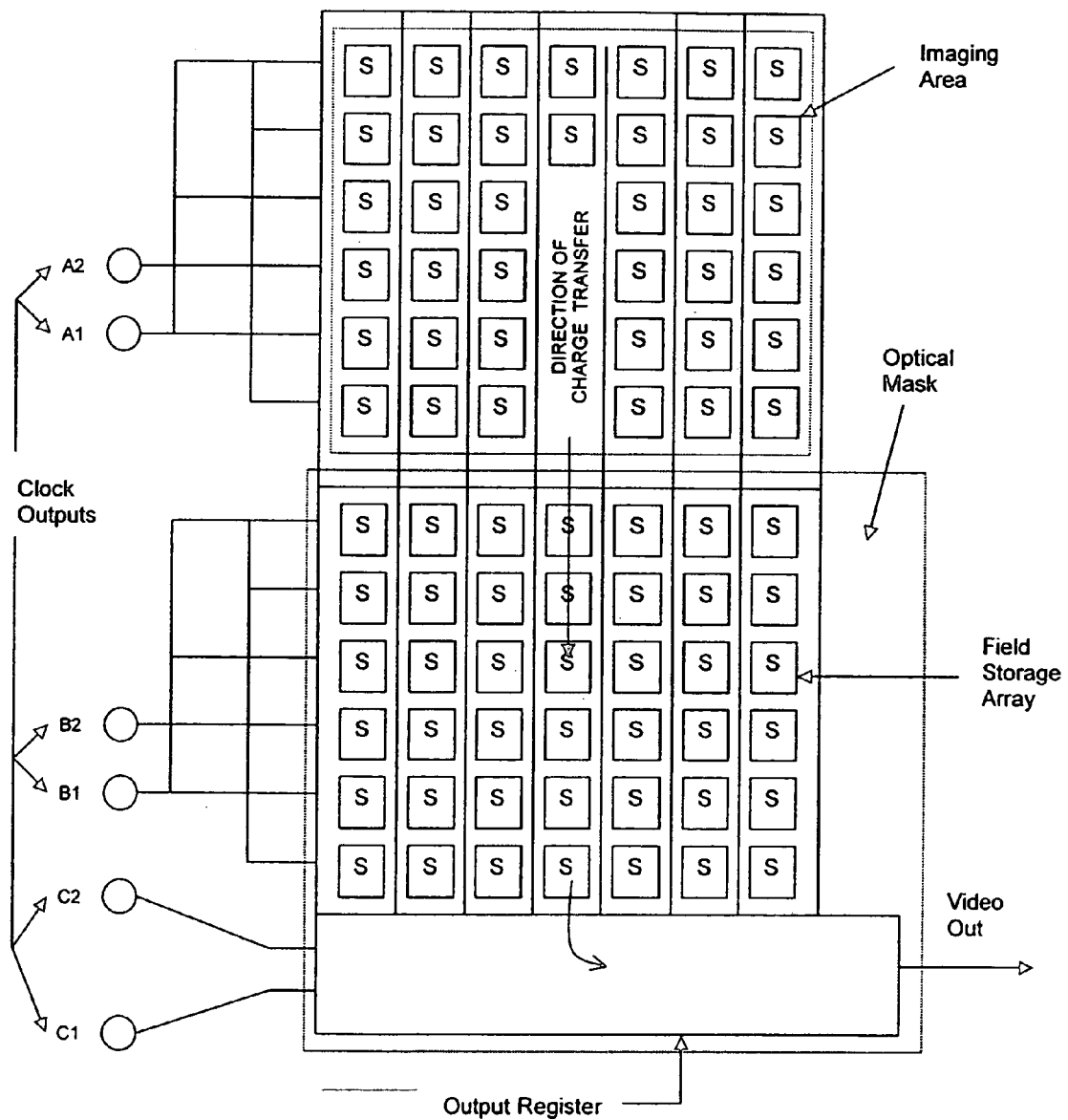
FIG. 2B is a schematic diagram of a typical CCD imaging surface.
Figure 3:
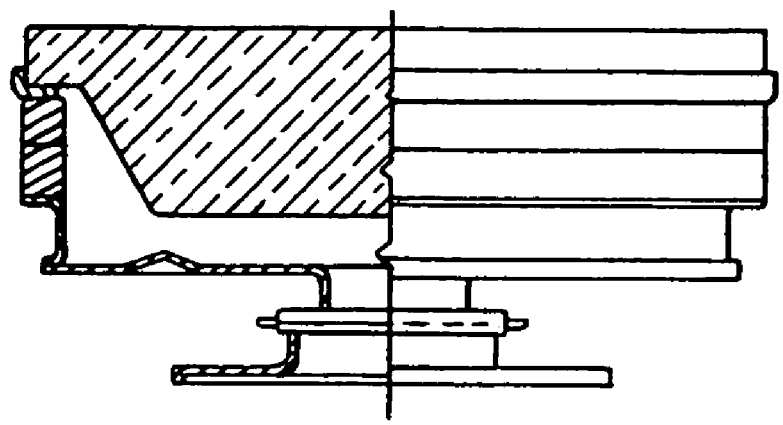
FIG. 3 is a cross-sectional view of a typical Electron Bombarded CCD device.

An electric biasing circuit 44 provides a biasing current to sensor 41. Electric biasing circuit 44 includes a first electrical connection 42 and a second electrical connection 43. First electrical connection 42 provides a biasing voltage between photo cathode 54 and MCP 53. The biasing voltage from first electrical connection 42 is preferably set so as to be less than the biasing voltage than the EBCCD/CMOS sensor cathode to CCD voltage, i.e., 2–10 kV. For example, one preferred biasing voltage could be similar to that of image tubes, such as ~1400V. Second electrical connection 43 applies a biasing voltage of between MCP 53 and CMOS sensor 56. Preferably, the biasing voltage applied through second electrical connection 43 is significantly less than the image tube—screen voltage of about 4200V of the prior art devices (FIG. 1). For example, the biasing voltage applied through second electrical connection 43 could be, but is not limited to ~100V. FIG. 4A illustrates one potential configuration of the sensor 41. In this configuration, photo cathode 54, MCP 53, and imaging sensor 56 are maintained in a vacuum body or envelope 61 as a single unit, in close physical proximity to each other.

Referring to FIG. 4B, in operation, light 58, 59 from an image 57 enters intensified hybrid solid-state sensor 41 through input side 54a of photo cathode 54. Photo cathode 54 changes the entering light into electrons 48, which are output from output side 54b of photo cathode 54. Electrons 48 exiting photo cathode 54 enter channels 52 through input surface 49 of MCP 53. After electrons 48 bombard input surface 49 of MCP 53, secondary electrons are generated within the plurality of channels 52 of MCP 53. MCP 53 may generate several hundred electrons in each of channels 52 for each electron entering through input surface 49. Thus, the number of electrons 47 exiting channels 52 is significantly greater than the number of electrons 48 that entered channels 52. The intensified number of electrons 47 exit channels 52 through output side 50 of MCP 53, and strike electron receiving surface 56a of CMOS imaging device 56.

Figure 6A:
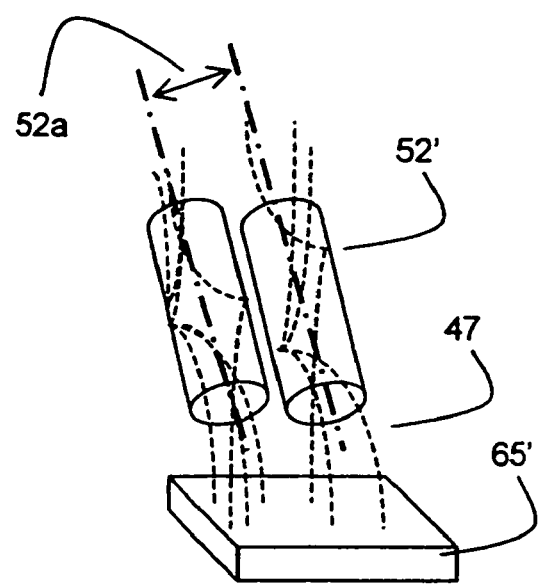
FIG. 6A is a perspective view of MCP channels having round profiles and a CMOS well.
Figure 6B:
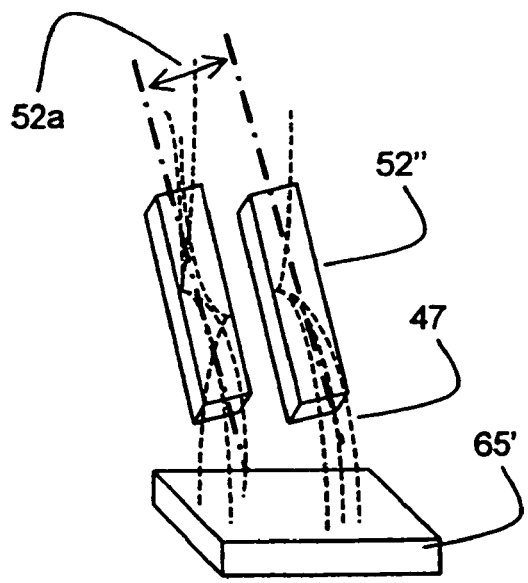
FIG. 6B is a perspective view of MCP channels having square profiles and a CMOS well.

FIGS. 6A–6B illustrate how the increased number of electrons 47 exit channels 52 (i.e., channels 52' in FIG. 6A, channels 52" in FIG. 6B) and strike a particular collection well 65' of CMOS imaging sensor 56. As can be seen from these illustrations, a relationship exists between the collection wells 65' and the number of channels 52 which emit electrons 47. In general, adjacent channels 52 of MCP 53 are separated by a predetermined channel pitch 52a. FIGS. 6A–6B illustrate a channel pitch 52a that results in more than one channel 52 per collection well 65'.

Figure 7A:
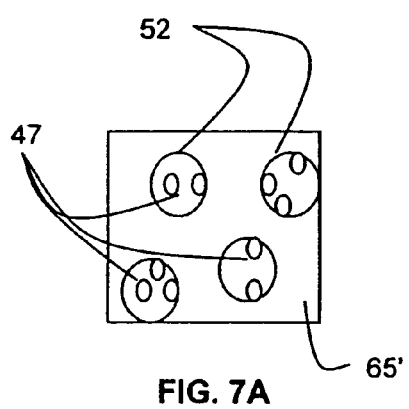
FIG. 7A is a schematic top view of a large pixel/small MCP channel pitch per unit area of the sensor surface according to the present invention.
Figure 7B:
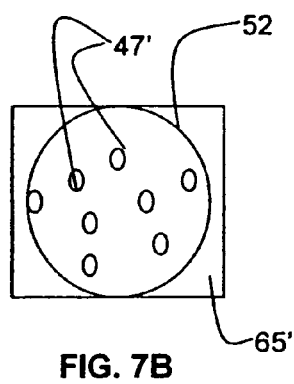
FIG. 7B is a schematic top view of a one-to-one pixel to MCP channel per unit area of the sensor surface according to the present invention.
Figure 7C:
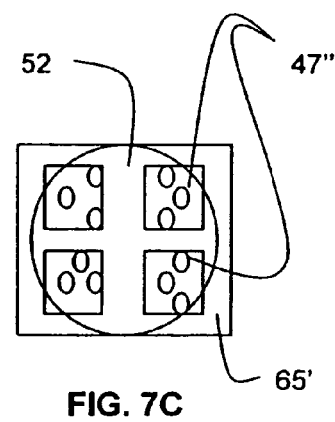
FIG. 7C is a schematic top view of a small CMOS pixel pitch/large MCP channel per unit area of the sensor surface according to the invention.

FIGS. 7A–7C illustrate three different alternatives of CMOS well/channel pitch relationships according to the invention. FIG. 7A illustrates one relationship between channel pitch 52 and a CMOS well 65'. In this case, channel pitch 52 is relatively small, while the size of CMOS well 65' is relatively large. This permits several electrons 47 from two or more channels 52 to strike CMOS collection well 65'. FIG. 7B illustrates another CMOS well/channel pitch relationship. In this embodiment, channel pitch 52 and the size of CMOS collection well 65' are approximately in a one-to-one relationship. As such electrons 47' from a single channel 52 strike a single collection well 65'. FIG. 7C illustrates another CMOS well/channel pitch relationship where channel pitch 52 is relatively large and the size of CMOS collection well 65' is relatively small. In this case electrons 47" from a single channel 52 strike multiple collection wells 65'. While each of these structures provide various advantages, the relationship illustrated in FIG. 7A is preferred for the present invention.

As a result, the intensified hybrid solid-state sensor operates in different conditions than any of the other prior art concepts. The result is that the MCP 53 can be mounted directly on the CMOS sensor 56 giving the hybrid device similar contrast to the all solid-state device, but with low halo, good signal-to-noise ratio, and logarithmic gain of the image tube. Since operating voltages are lower, the hybrid device can be gated like an image intensifier allowing operation from overcast starlight condition to daytime operation. The hybrid sensor has better halo from the lack of physical gap between MCP 53 and CMOS sensor 56. This lack of physical separation in the two components is also why contrast is improved when compared to the EBCCD/CMOS or image intensified camera. The hybrid device also has the logarithmic gain curve of the image tube. Unlike the EBCCD/CMOS sensor, the hybrid sensor can be gated due to the low cathode voltages.

Many of the components in image intensifier tubes relate to sampling devices. Such sampling devices collect a discrete spatial sample of an input signal and provide a discrete sampled output signal. Examples of such sampling devices in image intensifier tubes are the microchannel plate and the fiber-optic screen. For example, an MCP collects input electrons in the pores/channels, and outputs electrons from those very same pores/channels. In the case of a fiber-optic device, each individual fiber collects a spatial sample of light, thereby constraining the light within a fiber, and projecting the sampled image at the output of the fiber.

When such spatially sampled signals are overlayed on each other several patterns can be observed at the output. FIG. 8 illustrates a configuration 800 relating to pixels of a solid-state image sensor overlayed with channels of an electron multiplying device. More specifically, configuration 800 illustrates pixels 802a, 802b, 802c, and 802d of a solid-state image sensor overlayed with channels 804a, 804b, 804c, 804d, 804e, 804f, and 804g of an electron multiplying device. Configuration 800 illustrates misalignment of the sampling between the solid-state image sensor and the electron multiplying device. More specifically, some portions of channels 804a, 804b, 804c, 804d, 804e, 804f, and 804g align with pixels 802a, 802b, 802c, and 802d ; however, other portions of channels 804a, 804b, 804c, 804d, 804e, 804f, and 804g do not align with pixels 802a, 802b, 802c, and 802d.

These misalignments, when viewed (e.g., by a person viewing a monitor), can show up as one of a number of undesirable electro-optical patterns. For example, such an electro-optical pattern is known as Moiré. Moiré (and other electro-optical patterns such as aliasing) tend to be very distracting to a person trying to view real objects through such misaligned patterns.

Such optical patterns (i.e., misalignment patterns) often manifest themselves when the optical transfer quality from one element to another is very good. For example, FIG. 8 illustrates such a high transfer quality. In FIG. 8, if the edges of the pixels and/or channels were not quite so clear (i.e., the edges were fuzzy), the actual image being viewed may not display the Moiré patterns. When the electron multiplying device (e.g., the MCP) is laid in contact (or substantial contact) with the solid-state image sensor (e.g., a CMOS imager), very high quality image transfer occurs between the channels of the electron multiplying device and the pixels of the solid state image sensor. In such configurations, optical misalignment patterns such as Moiré would tend to be visible.

According to an exemplary embodiment of the present invention, Moiré and other undesirable optical patterns are avoided or substantially reduced by (1) arranging a plurality of channels of an electron multiplying device in a plurality of channel patterns, (2) arranging a plurality of pixels of a solid-state image sensor in a plurality of pixel patterns, and (3) mapping each of the plurality of channel patterns to a respective one of the plurality of pixel patterns such that electron signals from each of the plurality of channel patterns is substantially received by the single respective one of the plurality of pixel patterns. This alignment may be in any of a number of configurations, so long as the signals from each of the channel patterns is substantially aligned with the respective one of the pixel patterns such that optical misalignment (such as that illustrated in FIG. 8) does not occur.

According to another exemplary embodiment of the present invention, each of the plurality of channel patterns may be rotationally and translationally aligned with the respective one of the plurality of pixel patterns.

Figure 9A:
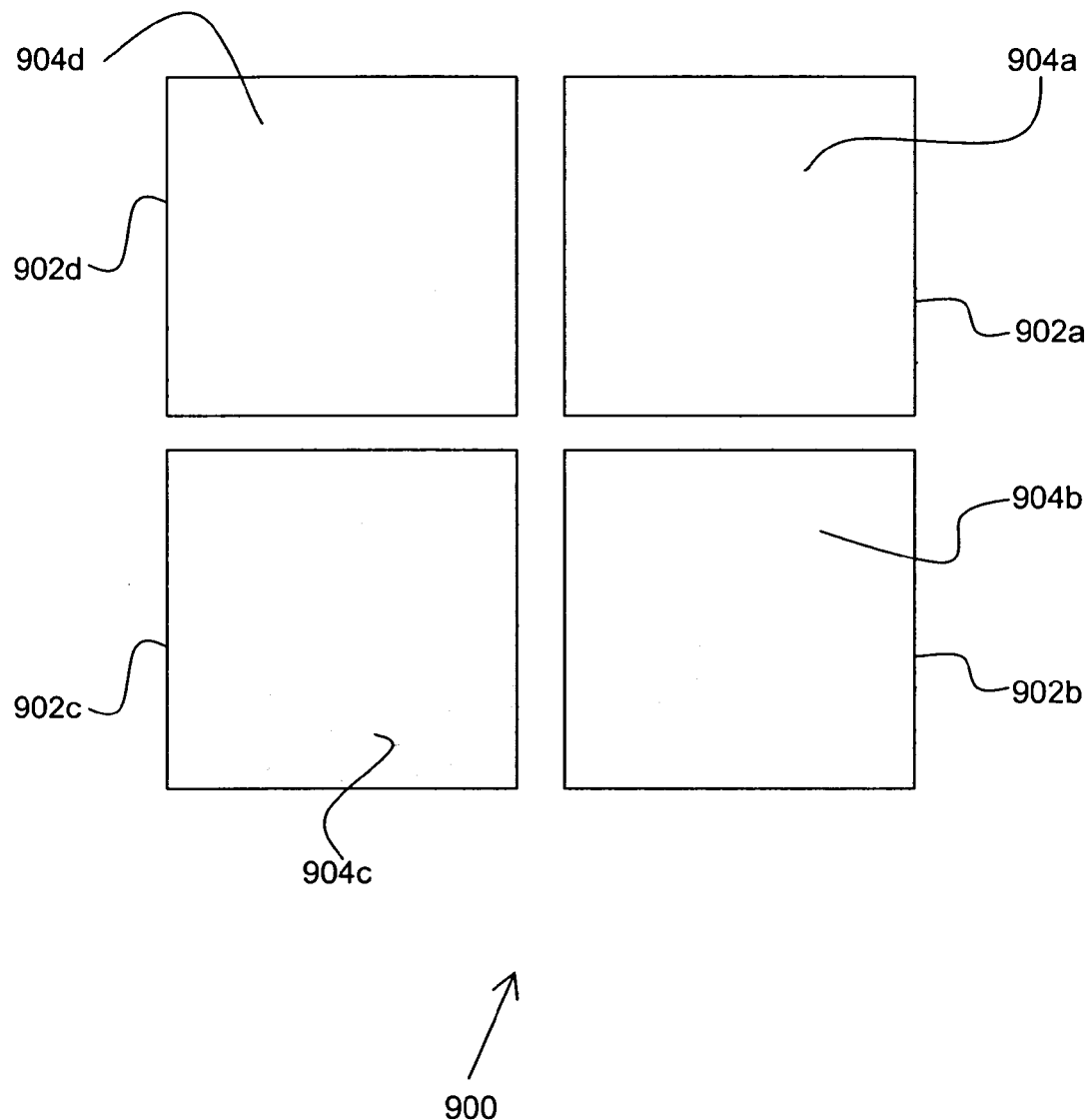
FIG. 9A is a block diagram illustration of an aligned electron multiplying device channel pattern with an image sensor pixel pattern according to an exemplary embodiment of the present invention.

For example, FIG. 9A illustrates an exemplary mapping 900, where mapping 900 includes pixels of a solid-state image sensor (arranged as 4 pixel patterns, each of the pixel patterns including a single pixel) overlayed with channels of an electron multiplying device (arranged as 4 channel patterns, each of the channel patterns including a single channel) (because of the mapping/registration of the channel patterns to pixel patterns in FIG. 9A, each of the mappings appears as a single square; however, each of the squares actually represents a pixel pattern overlayed with a channel pattern). More specifically, mapping 900 illustrates pixels 902a, 902b, 902c, and 902d (each of which represents a pixel pattern having a single pixel) of a solid-state image sensor overlayed with channels 904a, 904b, 904c, and 904d (each of which represents a channel pattern having a single channel). In this embodiment a single one of channels 904a, 904b, 904c, and 904d is aligned/mapped with a corresponding one of pixels 902a, 902b, 902c, and 902d. Further, the channels (e.g., pores of an MCP) are substantially the same size as, and have substantially the same center-to-center spacing as, the pixels (e.g., pixels of an image sensor).

In certain exemplary embodiments of the present invention, it is desirable to align the channels of the electron multiplying device with the pixels of the solid-state image sensor during assembly of the imaging sensor. One assembly method to ensure proper alignment is to shine a light through the electron multiplying device, thereby allowing for observation of the reflected pattern of the solid-state image sensor. If no undesirable misalignment pattern is visible (e.g., Moiré), then the channels of the electron multiplying device are substantially aligned with the pixels of the solid-state image sensor. Of course, other methods of alignment are available.

FIG. 9A is only one of a number of mapping configurations that provides for alignment of the channel patterns of the electron multiplying device with the respective pixel patterns of the solid-state image sensor. A number of additional configurations are possible. FIGS. 9B–9E are additional examples of such mapping configurations.

Figure 9B:
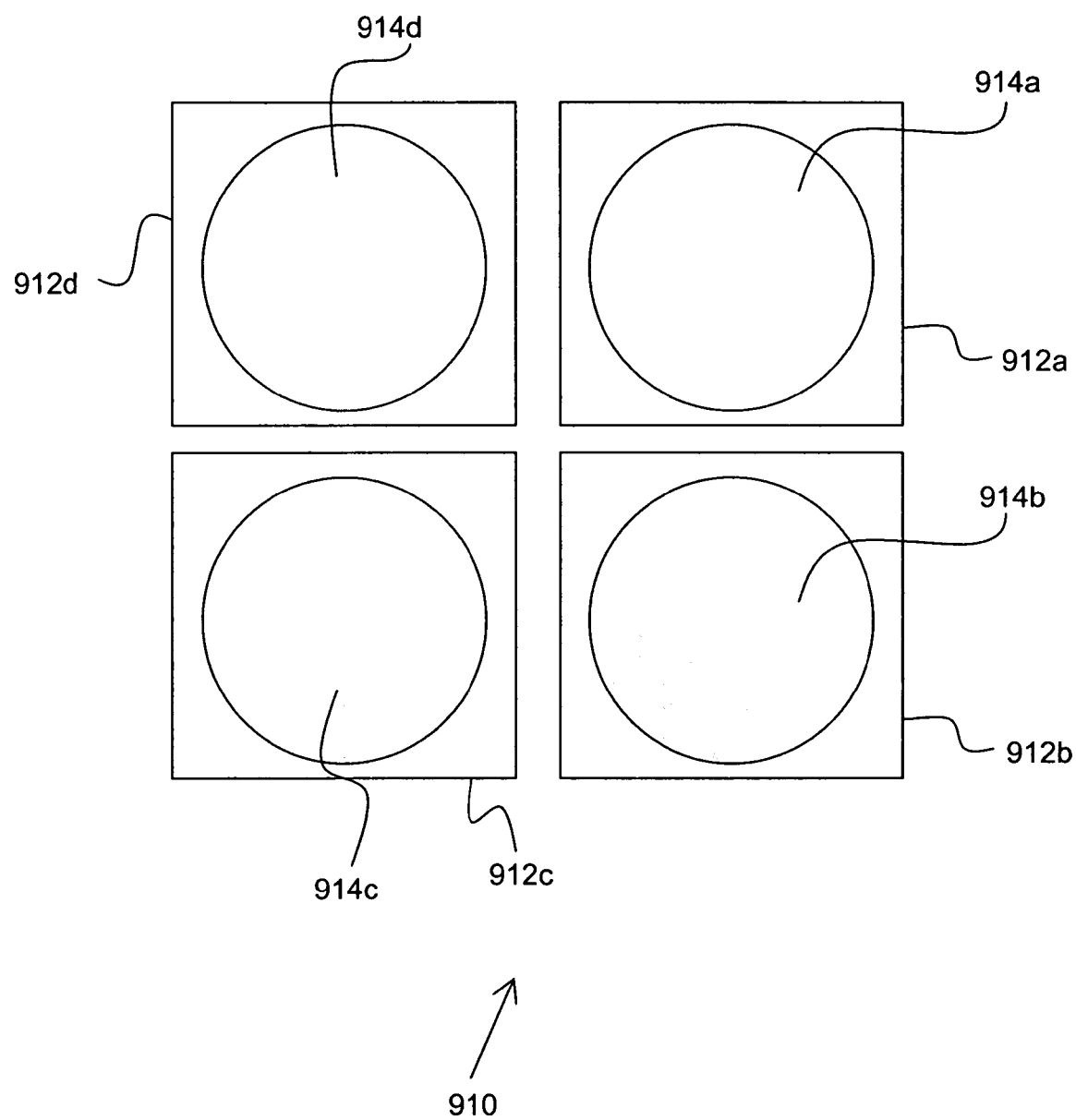
FIG. 9B is a block diagram illustration of another aligned electron multiplying device channel pattern with an image sensor pixel pattern according to another exemplary embodiment of the present invention.

FIG. 9B illustrates an exemplary mapping 910, where mapping 910 includes pixels of a solid-state image sensor (arranged as 4 pixel patterns, each of the pixel patterns including a single pixel) overlayed with channels of an electron multiplying device (arranged as 4 channel patterns, each of the channel patterns including a single channel). More specifically, mapping 910 illustrates pixels 912a, 912b, 912c, and 912d of a solid-state image sensor (each of which represents a pixel pattern having a single pixel) overlayed with channel patterns 914a, 914b, 914c, and 914d (each of which represents a channel pattern having a single channel). In this embodiment a single one of channels 914a, 914b, 914c, and 914d is aligned with a corresponding one of pixels 912a, 912b, 912c, and 912d. The embodiment illustrated in FIG. 9B is similar to the embodiment illustrated in FIG. 9A in that there is a one-to-one correlation between channels of the electron multiplying device and the pixels of the solid-state image sensor; however, the channels of the electron multiplying device in FIG. 9B are not substantially the same size and/or shape as the pixels of the solid-state image sensor. Regardless, the channels of the electron multiplying device and the pixels of the solid-state image sensor are aligned with one another. Because of the alignment, there is a substantial reduction in the potential for undesirable optical patterns (e.g., Moiré).

Figure 9C:
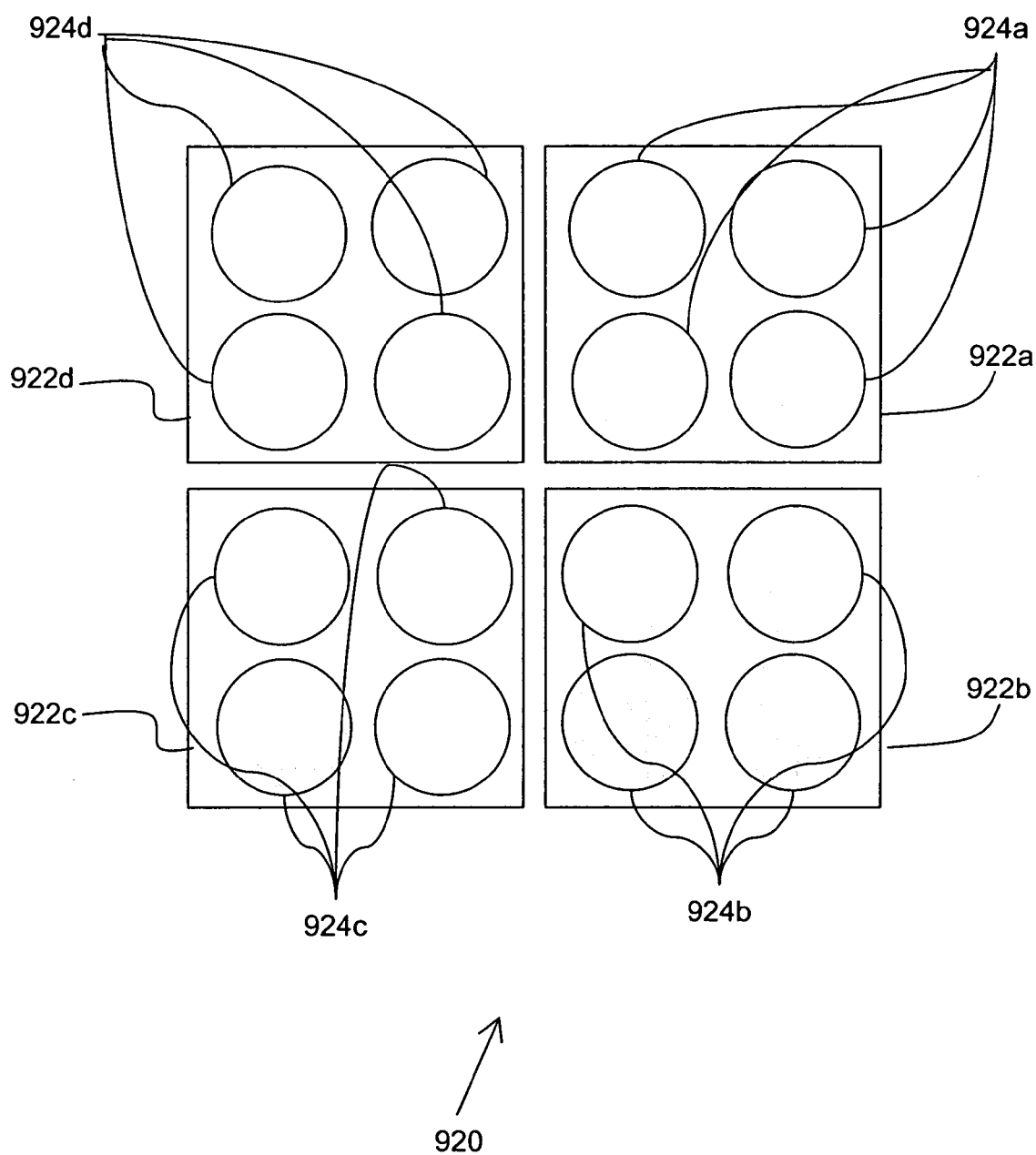
FIG. 9C is a block diagram illustration of yet another aligned electron multiplying device channel pattern with an image sensor pixel pattern according to another exemplary embodiment of the present invention.

FIG. 9C illustrates an exemplary mapping 920, where mapping 920 includes pixels of a solid-state image sensor (arranged as 4 pixel patterns, each of the pixel patterns including a single pixel) overlayed with channels of an electron multiplying device (arranged as 4 channel patterns, each of the channel patterns including four channels). More specifically, mapping 920 illustrates pixels 922a, 922b, 922c, and 922d of a solid-state image sensor (each of which represents a pixel pattern having a single pixel) overlayed with channels 924a, 924b, 924c, and 924d (four of which represent a single channel pattern). In this embodiment a single one of pixels 922a, 922b, 922c, and 922d is mapped/aligned with a corresponding channel pattern, where each of the channel patterns includes four channels (i.e., four of channels 924a, 924b, 924c, and 924d, respectively). The mapping/alignment of the channel patterns of the electron multiplying device and the pixel patterns of the solid-state image sensor results in a substantial reduction in the potential for undesirable optical patterns (e.g., Moiré).

Figure 9D:
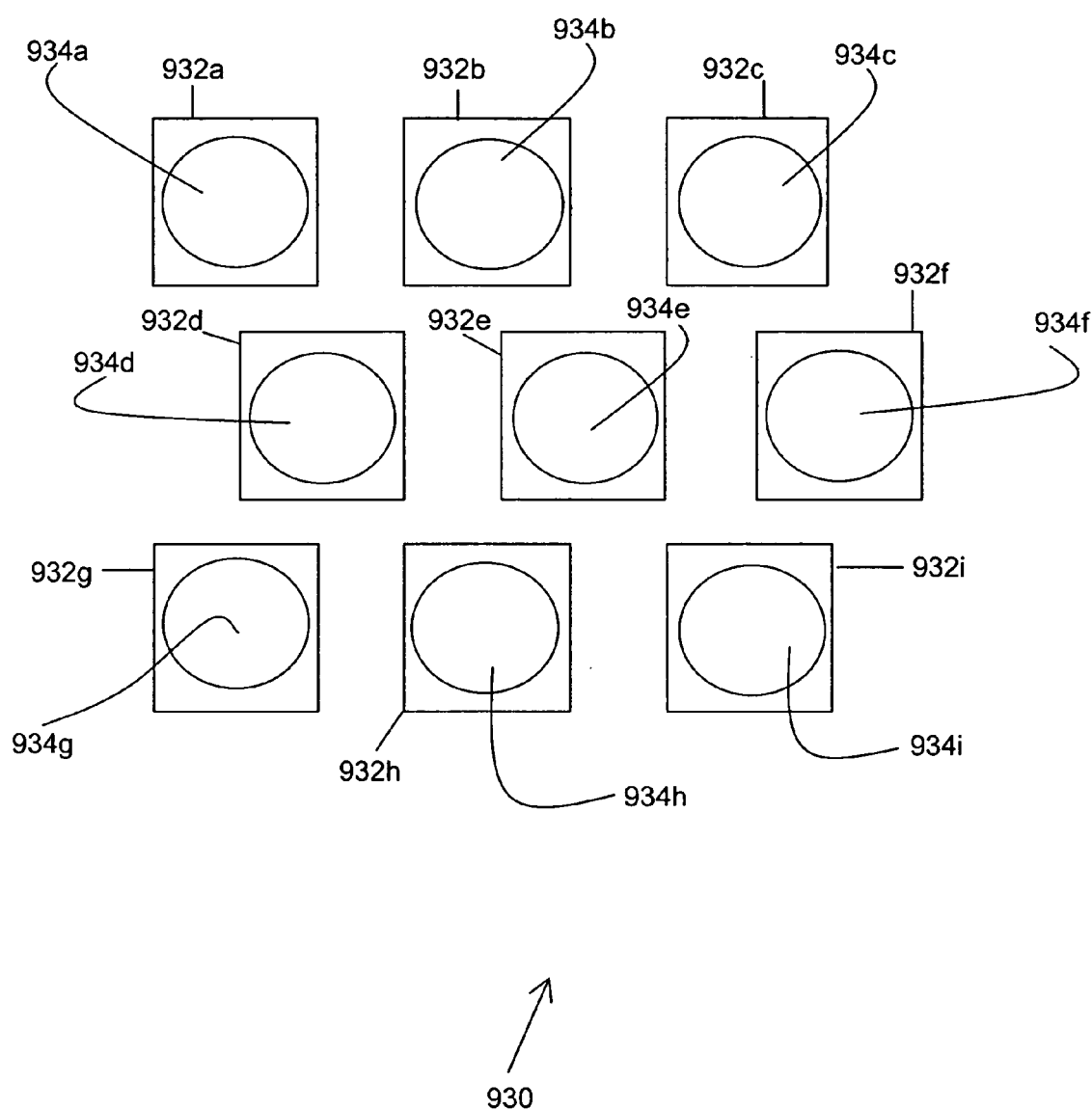
FIG. 9D is a block diagram illustration of yet another aligned electron multiplying device channel pattern with an image sensor pixel pattern according to another exemplary embodiment of the present invention.

FIG. 9D illustrates an exemplary mapping 930, where mapping 930 includes pixels of a solid-state image sensor (arranged as 9 pixel patterns, each of the pixel patterns including a single pixel) overlayed with channels of an electron multiplying device (arranged as 9 channel patterns, each of the channel patterns including a single channel). More specifically, mapping 930 illustrates pixels 932a, 932b, 932c, 932d, 932e, 932f, 932g, 932h, and 932i of a solid-state image sensor (each of which represents a pixel pattern including a single pixel) overlayed with channels 934a, 934b, 934c, 934d, 934e, 934f, 934g, 934h, and 934i (each of which represents a channel pattern having a single channel). In this embodiment a single one of channels 934a, 934b, 934c, 934d, 934e, 934f, 934g, 934h, and 934i is mapped/aligned with a corresponding one of pixels 932a, 932b, 932c, 932d, 932e, 932f, 932g, 932h, and 932i. The mapping/alignment of the channel patterns of the electron multiplying device and the pixel patterns of the solid-state image sensor results in a substantial reduction in the potential for undesirable optical patterns (e.g., Moiré).

Figure 9E:
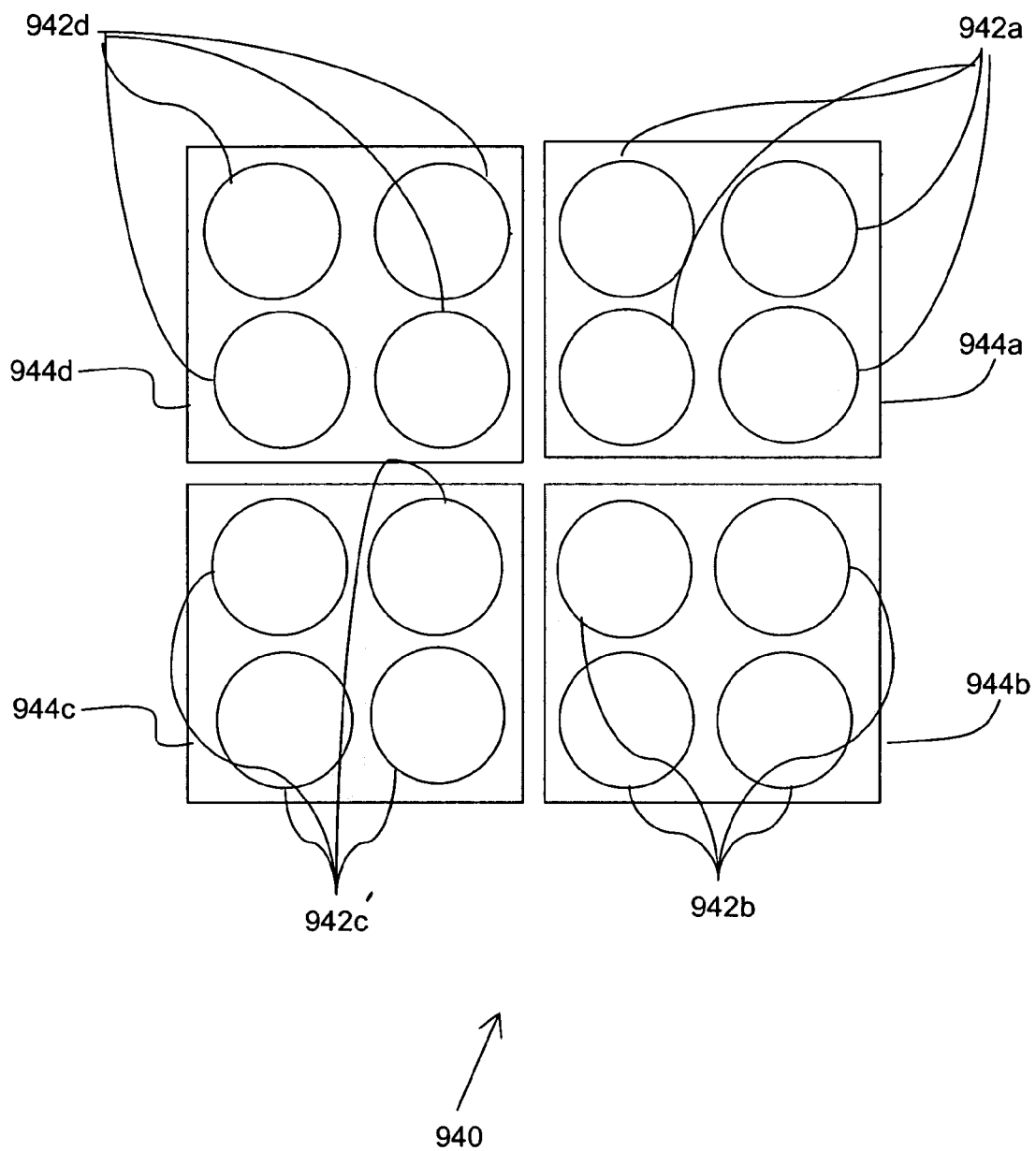
FIG. 9E is a block diagram illustration of yet another aligned electron multiplying device channel pattern with an image sensor pixel pattern according to another exemplary embodiment of the present invention.

FIG. 9E illustrates an exemplary mapping 940, where mapping 940 includes pixels of a solid-state image sensor (arranged as 4 pixel patterns, each of the pixel patterns including four pixels) overlayed with channels of an electron multiplying device (arranged as 4 channel patterns, each of the channel patterns including a single channel). More specifically, mapping 940 illustrates pixels 942a, 942b, 942c, and 942d (four of which represent a single pixel pattern) of a solid-state image sensor overlayed with channels 944a, 944b, 944c, and 944d of an electron multiplying device (each of which represents a channel pattern having a single channel). In this embodiment a single one of channels 944a, 944b, 944c, and 944d is mapped/aligned with a corresponding pixel pattern, where each of the pixel patterns includes four pixels (i.e., four of wells 942a, 942b, 942c, and 942d, respectively). The mapping/alignment of the channel patterns of the electron multiplying device and the pixel patterns of the solid-state image sensor results in a substantial reduction in the potential for undesirable optical patterns (e.g., Moiré).

The embodiments of the present invention illustrated in FIGS. 9A–9E, and described above, are exemplary in nature. Various alternative configurations are contemplated. For example, the number of channels in each of the channel patterns, and/or the number of pixels in each of the pixel patterns may be varied in accordance with the present invention. Further, the size and/or shape of the channels and/or pixels may be varied in accordance with the present invention. Further still, the mapping of channel patterns to pixel patterns may also be varied in accordance with the present invention.

As used herein, a pixel is intended to refer to an element of an image sensor (e.g., a solid-state image sensor) that receives electrons or electron energy. Pixels include wells for storing the electron energy received.

The above detailed description of a preferred embodiment of the invention sets forth the best mode contemplated by the inventor for carrying out the invention at the time of filing this application and is provided by way of example and not as a limitation. Accordingly, various modifications and variations obvious to a person of ordinary skill in the art to which it pertains are deemed to lie within the scope and spirit of the invention as set forth in the following claims.

What is claimed:

1. An intensified solid-state imaging sensor comprising:
   a photo cathode for converting light from an image into electrons;
   an electron multiplying device for receiving electrons from the photo cathode, the electron multiplying device outputting a greater number of electrons than the electron multiplying device receives from the photo cathode; and
   a solid-state image sensor including a plurality of pixels for receiving the electrons from the electron multiplying device through a plurality of channels of the electron multiplying device, the solid-state image sensor generating an intensified image signal from the electrons received from the electron multiplying device,
   the plurality of channels being arranged in a plurality of channel patterns, and the plurality of pixels being arranged in a plurality of pixel patterns, each of the plurality of channel patterns being mapped to a respective one of the plurality of pixel patterns and
   each of the pixels and each of the channels includes, respectively, a pixel face surface and a channel face surface in opposing relationship to each other,
   the pixel and channel face surfaces each having a linear boundary,
   wherein respective linear boundaries of the plurality of channels are arranged so that they do not cross respective linear boundaries of the plurality of pixels.

2. The intensified solid-state imaging sensor of claim 1 wherein each of the plurality of channel patterns comprises a single channel, and each of the plurality of pixel patterns comprises a single pixel.

3. The intensified solid-state imaging sensor of claim 2 wherein each of the plurality of channel patterns is substantially the same size and shape as the respective one of the plurality of pixel patterns.

4. The intensified solid-state imaging sensor of claim 1 wherein each of the plurality of channel patterns comprises a plurality of channels, and each of the plurality of pixel patterns comprises a single pixel.

5. The intensified solid-state imaging sensor of claim 1 wherein each of the plurality of channel patterns comprises a single channel, and each of the plurality of pixel patterns comprises a plurality of pixels.

6. The intensified solid-state imaging sensor of claim 1 wherein each of the plurality of channel patterns comprises a plurality of channels, and each of the plurality of pixel patterns comprises a plurality of pixels.

7. The intensified solid-state imaging sensor of claim 1 wherein each of the plurality of channel patterns is rotationally and translationally aligned with the respective one of the plurality of pixel patterns.

8. The intensified solid-state imaging sensor of claim 1 wherein the electron multiplying device comprises a multi-channel plate, and the plurality of channels comprises a plurality of pores of the multi-channel plate.

9. The intensified solid-state imaging sensor of claim 1 wherein the solid-state image sensor is CCD device.

10. The intensified solid-state imaging sensor of claim 1 wherein the solid-state image sensor is a CMOS device.

* * * * *